Figure 2:
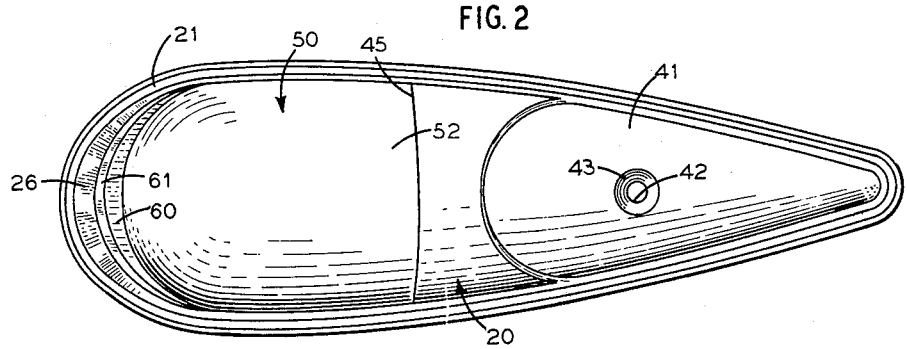

Jan. 11, 1966  V. KOLJONEN ETAL  3,229,081
CAB MARKER LAMP FOR COMMERCIAL AUTOMOTIVE VEHICLES
Filed Oct. 30, 1963  4 Sheets-Sheet 1

INVENTORS
Vilho Koljonen
George E. Gush
Elliott Goldbaum
BY
ATTORNEYS

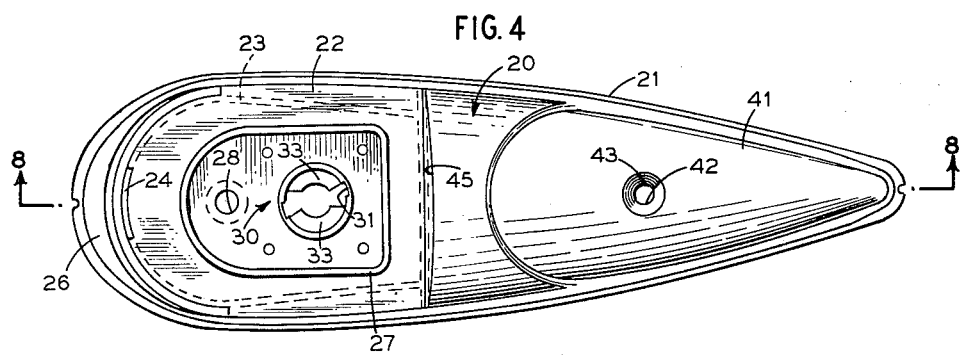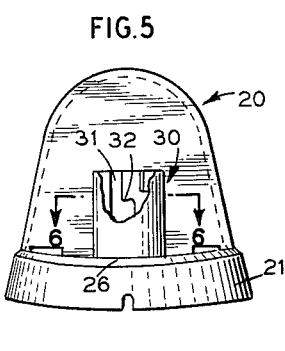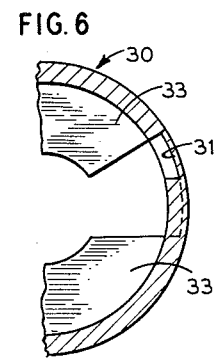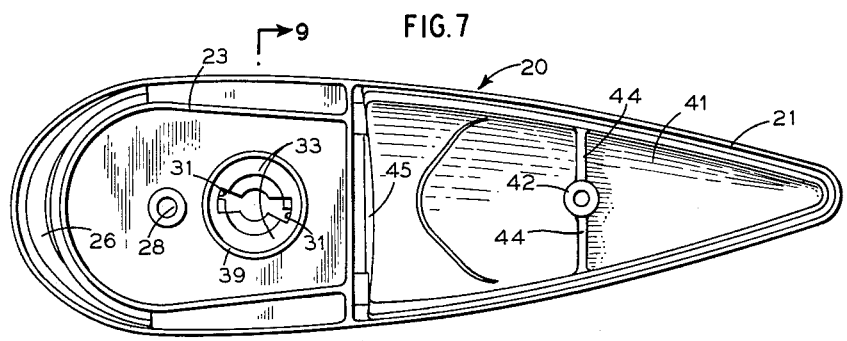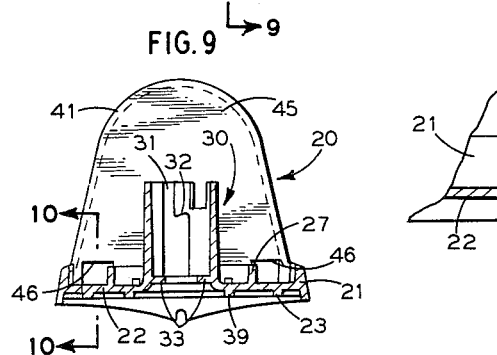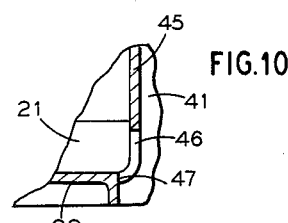

United States Patent Office 3,229,081
Patented Jan. 11, 1966

1

3,229,081
CAB MARKER LAMP FOR COMMERCIAL AUTOMOTIVE VEHICLES
Vilho Koljonen, Brooklyn, George E. Gush, Jamaica, and Elliott Goldbaum, Brooklyn, N.Y., assignors to Lehigh Valley Industries, Inc., New York, N.Y., a corporation of Delaware
Filed Oct. 30, 1963, Ser. No. 320,173
11 Claims. (Cl. 240—7.1)

This invention relates to marker lamps for automotive vehicles, particularly commercial vehicles such as trucks, buses, and the like. More particularly, the present invention is directed to a cab marker lamp for commercial automotive vehicles and characterized by ease of maintenance and servicing and by a weather-proof construction.

In the design of lamp equipment for commercial automotive vehicles, and particularly marker lamp equipment, careful consideration must be given to several factors. One factor to be carefully considered is proper optical design of the lens to provide the light pattern which is either desired or which may, in some instances, be required by law. Another factor which must be taken into consideration is the design of the lamp with respect to repair and servicing thereof.

This latter factor is rather important as, frequently, lamps will become defunct during operation of the vehicle and it is then incumbent upon the driver to repair or service the lamp, as it may not be possible for him to take the vehicle to a service station for repair or replacement of lamp bulbs, for example. Such repair and replacement of lamp bulbs is made rather difficult, in most instances, by the fact that it is generally necessary to unscrew a retaining rim or the like in order to remove a lens so that access may be had to a burned out bulb, for example. This requires that the driver have with him a screwdriver or like equipment in order to change a lamp bulb, and in addition the amount of time required is of importance.

In accordance with the present invention, a novel cab marker lamp for commercial automotive vehicles is provided which has excellent optical properties and which furthermore is very easy to service and maintain. Thus, the lamp of the present invention includes a metal base or casing and a transparent or translucent lens which is easily engaged and disengaged with the base or casing, the lens and casing cooperatively enclosing a lamp bulb.

A feature of the invention is that the socket of the lamp bulb may form an integral part of the metal base or casing. A further feature of the invention is that the lens may be easily removed from the casing by a relatively simple operation and not requiring the use of special tools. Despite this, when the lens is reassembled with the casing, a completely weather-proof or weather-sealed fit is provided between the casing and the lens, thus protecting the lamp bulb and interior parts from weather damage.

The lamp of the present invention is also characterized by simplicity of manufacture and economy of materials, thus making the lamp relatively inexpensive.

Figure 1:
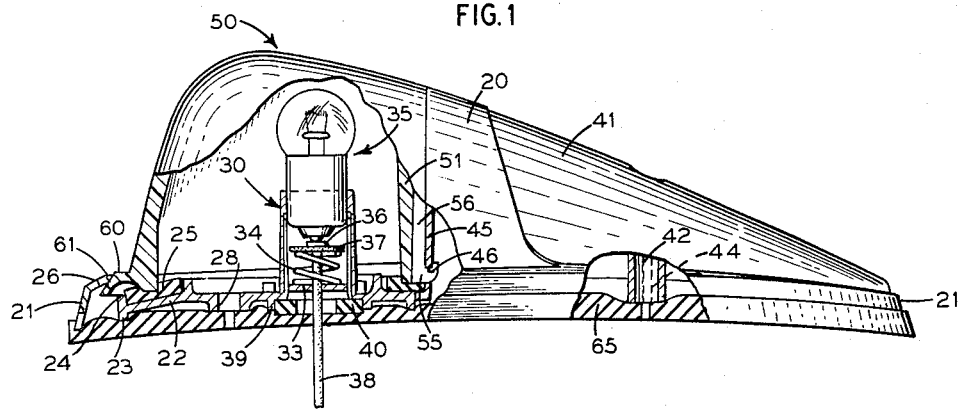

For an understanding of the principles of the invention, reference is made to the following description of a typical embodiment thereof as illustrated in the accompanying drawings. In the drawings:

FIG. 1 is a side elevational view, partly in section, of a cab lamp embodying the invention;

2

Figure 3:
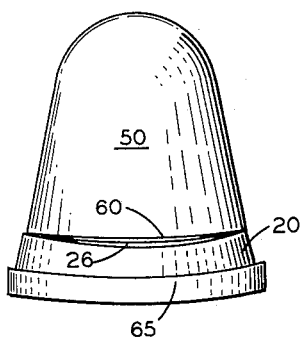
Figure 8:
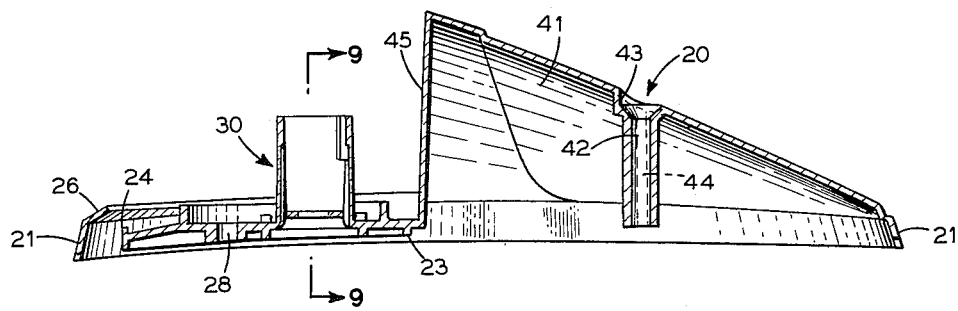
Figure 11:
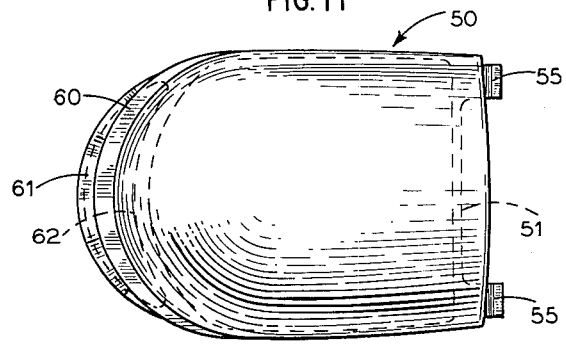
Figure 12:
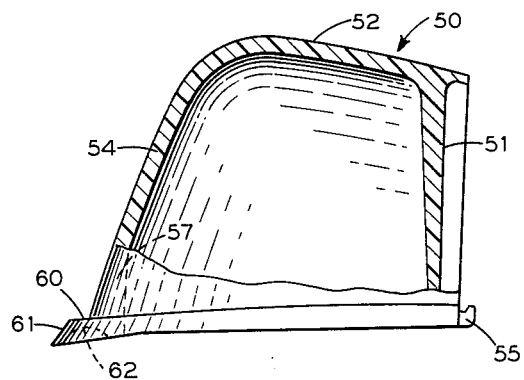
Figure 13:
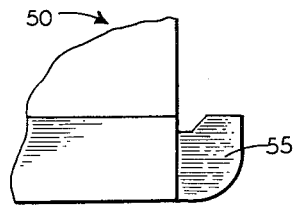
Figure 14:
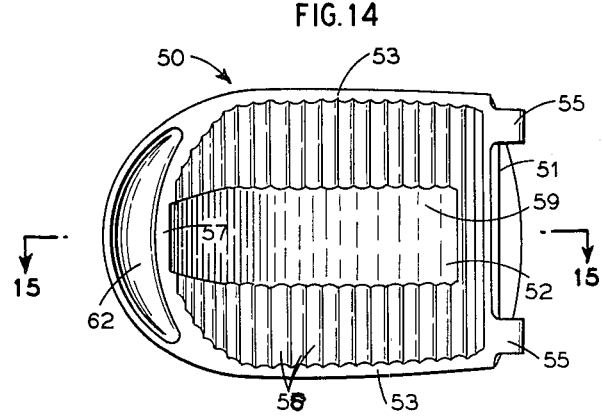
Figure 15:
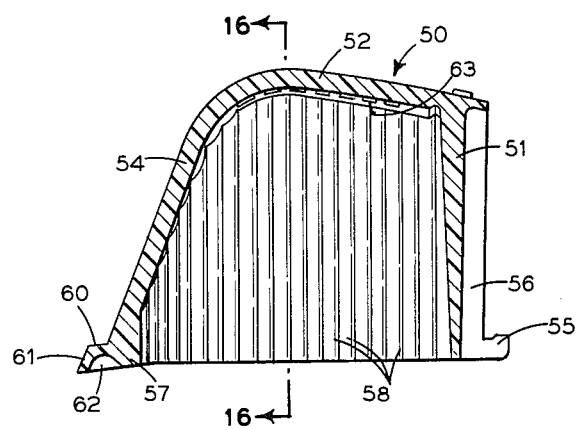
Figure 16:
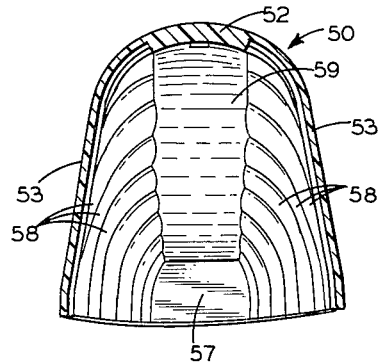

FIG. 2 is a top plan view of the lamp shown in FIG. 1;
FIG. 3 is a front elevational view of the lamp shown in FIG. 1;
FIG. 4 is a top plan view of a lamp housing or casing in accordance with the invention;
FIG. 5 is a front elevational view of the casing, with the lens removed;
FIG. 6 is a section on the line 6—6 of FIG. 5;
FIG. 7 is a bottom plane view of the lamp casing shown in FIGS. 4, 5 and 6;
FIG. 8 is a longitudinal sectional view of the lamp, taken on the line 8—8 of FIG. 4;
FIG. 9 is a vertical sectional view taken on the line 9—9 of FIG. 8;
FIG. 10 is a detailed sectional view taken on the line 10—10 of FIG. 9;
FIG. 11 is a top plan view of the lens of the lamp embodying the invention;
FIG. 12 is a side elevational view, partly in section, of the lens shown in FIG. 11;
FIG. 13 is an enlarged detailed view of a portion of FIG. 12;
FIG. 14 is a bottom or inside plan view of the lens;
FIG. 15 is a sectional view of the lens, taken on the line 15—15 of FIG. 14; and
FIG. 16 is a transverse vertical sectional view of the lens, taken on the line 16—16 of FIG. 15.

Referring to FIGS. 1, 2 and 3, the lamp comprises a base 20, which is preferably cast or otherwise formed of metal, a lens 50, which may be glass or transparent or translucent plastic composition material, and a mounting pad 65. Base 20 and lens 50 cooperate to form a weather-proof enclosure, which is sealed against the entrance of moisture, for a lamp bulb 35 mounted in a socket 30 which may be formed integral with base 20. It will be noted that the lamp has an overall generally streamline appearance, tapering from a relatively blunt forward end to a relatively narrow rear end, both in vertical elevation and in horizontal plan.

Referring more particularly to FIGS. 1 and 4 through 10, housing 20 is a cast or molded metal member including a peripheral rim 21 whose lower edge preferably is bowed upwardly a slight amount longitudinally so as to have resting engagement, in cooperation with gasket 65, with respect to the surface of a cab room. Adjacent its forward end, housing 20 has a base portion or platform 22 which is recessed relative to the upper periphery of rim 21 and arranged to form a seat for a gasket 25 which forms a sealing support for the lens 50. A reinforcing and sealing rib 23 extends downwardly from base 22 as best seen in FIG. 7 and, as best seen in FIG. 8, the lower edge of rib 23 is substantially parallel to but spaced slightly above the lower edge of the rim 21. At the forward edge of platform 22, a rib 24, which is arcuate in plan and aligned with rib 23, extends above the surface of the platform. The arcuate extent of rib or lip 24 may be, for example, about 40 degrees. For a purpose to be described, rim 21, adjacent the forward end of the housing, has an inwardly and rearwardly sloping lip 26 which has a maximum width at the center of the housing 20 and tapers or feathers from the center in either direction. The inner edge of lip 26 is spaced outwardly from the lip 24, as best seen in FIGS. 1 and 8.

A rib 27 is formed to extend from the upper surface of platform 22, and is continuous to define, with the upwardly projecting portion of rim 21, lip 24 and a partition 45, a generally annular seating area for an annular gasket 25 of rubber or suitable resilient and flexible material. Within the area defined by the rib 27, platform 22 is formed with a reinforced aperture or boss 28 to receive a screw or bolt for attaching the lamp to a supporting surface.

As stated, socket 30 may be formed integral with housing or base 20, and may be an upward tubular extension from platform 22, located within the area defined by rib 27. The thickness of the walls of socket 30 decreases upwardly. As best seen in FIG. 9, a bayonet lock for the bayonet base of lamp bulb 35 is formed by a pair of diametrically opposite vertically extending grooves 31 in the inner surface of socket 30. The upper portions of these grooves 31 are relatively narrow, and at a short distance below the upper edge of socket 30, each groove 31 widens into a wider portion by virtue of a transition section in the nature of a hook 32. Thus, the pins on the base of lamp bulb 35 may be moved downwardly in grooves 31 and, by a twisting motion applied to the bulb, be turned to engage beneath hook portions 32 thereby locking the bulb in position.

A pair of arcuate wings or lips 33 project inwardly and partially across the interior of socket 30 at a level just above platform 22. Lips 33 serve as a seat for the coil spring 34 of the usual contact arrangement involving a contact 36 engageable with the base contact of bulb 35 and supported upon a dielectric washer 37. A conductor 38 is electrically and mechanically connected to contact 36 in the usual manner and extends through the aperture between lips or wings 33. When bulb 35 is inserted into socket 30 in the usual manner, spring 34 is initially compressed and then expands to force the pins on the base of the bulb beneath hook portions 32 of the bayonet lock. A rib 39 is formed on the under surface of base 22, and is concentric with socket 30 but somewhat larger in diameter. Rib 39 serves to define an annular seating surface for a washer or annular body 40 of rubber or other suitable flexible and resilient material.

The portion of housing 20 rearwardly of platform 22 is generally of inverted parabolic transverse cross section and is hollow and downwardly opening. This hollow rear portion 41 decreases in height from the rear end of platform 22 to the rear end of housing or base 21, and preferably forms a substantially flush continuation of the external surface contours of lens 50. A substantially vertical partition 45 forms the forward wall of housing portion 41, partition 45 being off vertical to a slight extent so that it slopes rearwardly and upwardly. For a purpose to be described, partition 45 is formed with a pair of preferably substantially rectangular, transversely spaced apertures 46 adjacent its junction with platform 22, and platform 22 is formed with short continuations of these apertures, as best indicated at 47 in FIG. 10.

Rearwardly of partition 45, hollow housing portion 41 is formed, on its center line, with a relatively elongated downwardly extending tubular boss 42 having a countersunk outer end 43, boss 42 being reinforced by ribs 44 extending radially therefrom. Tubular boss 42 is arranged to receive a bolt or stud for attaching the lamp to a suitable support surface.

Referring to FIGS. 1, 2, 3 and 11 through 16, lens 50 is a hollow element which may be formed of any suitable transparent or translucent material, such as glass, plastic composition material, and the like.

Lens 50 has an essentially parabolic cross section conforming to the cross section of the hollow portion 41 of housing 20, and increases in height from a rear wall toward the front end of the lens. The lens includes a rear wall 51, which increases in thickness in a vertical direction, a top wall 52, side walls 53, and a downwardly and outwardly sloping forward wall 54. Rear wall 51 is spaced somewhat forwardly from the rear edges of side walls 53 and top wall 52. A pair of ribs 56 extends vertically along the outer surface of rear wall 51, ribs 56 each being disposed adjacent a side wall 53. Each rib 56 is formed with an outwardly projecting hook portion 55, preferably of substantially rectangular configuration, and each arranged to engage in an aperture 46 of partition 45 of base 20. These hooks are shown in some detail in FIG. 13.

Adjacent its lower end, front wall 54 is thickened, as at 57, and is further formed with a forwardly projecting crescent shape lip 60 which extends arcuately of the lower portion of the lens and merges smoothly with the side walls thereof. Lip 60 has a substantially horizontal upper surface and a bevelled forward edge 61. The under surface of the lip may be hollowed out, as indicated at 62. The purpose of hooks 55 and lip 60 will be made apparent hereinafter.

FIGS. 14 through 16 illustrate the optics of lens 50. Referring to these figures, the inner surface of the lens is characterized by a series of inwardly convex ribs 58 running transversely of the lens. A relatively smooth area 59 extends longitudinally of top wall 52 and along the inner surface of front wall 54, relatively smooth area 59 providing a central interruption for ribs 58. This smooth area 59 may contain lettering or other indicia, as indicated at 63, for example.

In mounting the lamp on a surface of an automotive vehicle, base 20 has gasket 65 interposed beneath its lower surfaces and the mounting surface, gasket 65 being of rubber or other equivalent resilient and flexible material. Gasket 65, in plan, corresponds generally to the plan of housing 20 but is slightly larger than the housing so that gasket 65 shrouds rim 21 forming therewith a water barrier, as best seen in FIGS. 1 and 2. Gasket 65 is provided with suitable apertures for conductor 38 and for the attaching screws which are received in apertures 28 and in boss 42 of housing 20. It will be noted that the lower end of boss 42 somewhat compresses gasket 65 to form a tight seal therewith, and that washer 40 is compressed against gasket 65, likewise to form a tight seal, this water-proof seal being formed cooperatively by washer 40 and gasket 65. Also, lower rib 23 bears firmly against gasket 65, somewhat compressing the same, likewise to assist in forming a water-proof seal when housing 20 is anchored to its support surface by bolts or studs passed through aperture 28 and through boss 42. Gasket 65 is of such thickness and resilience that it provides for proper mounting of the lamp on surface contours ranging from relatively flat to relatively curved.

Lens 50 may be assembled to housing 20 after the housing has been suitably secured to a support base. In assembling lens 50 to housing 20, the lens is tilted somewhat counterclockwise from the position of FIG. 1 to engage lip 60 and its sloping edge 61 beneath sloping lip 26 on housing rib 21. The lens is then moved forwardly, compressing gasket 25, until such time as lens 50 may be turned clockwise to bring hooks 55 into alignment with apertures 46. Lens 50 is then moved rearwardly to engage hooks 55 through apertures 46, with sloping surface 61 of lip 60 remaining in engagement with lip 26 of rim 21 of housing 20. This firmly and securely anchors lens 50 to housing 20, and it will be noted that the outer surfaces of the lens and of the housing are preferably a smooth continuation of each other. To obtain access to bulb 35, it is merely necessary to press inwardly on the rear portion of lens 50, and then to slide lens 50 forwardly to disengage hooks 55 from apertures 46. Lens 50 then may be tilted counterclockwise and lip 60 disengaged from lip 26, thereby providing access to bulb 35. No tools are required in this operation.

Among the advantages of the invention lamp are its smooth streamline shape and its provision of a water-tight and weather-tight enclosure for lamp bulb 35, due to the interengagement of housing 20 with gasket 65 and the interengagement of washer 40 with gasket 65, as well as the compression of gasket 65 by the ribs, such as 23, on the lower surface of housing 20. While shown as separate members, washer or annular body 40 and gasket 65 could be formed as a single molded element.

While a specific embodiment of the invention has been shown and described in detail to illustrate the application of the principles of the invention, it will be understood that the invention may be embodied otherwise without departing from such principles.

What is claimed is:

1. An automotive vehicle marker lamp comprising, in combination, a housing including a lens supporting platform, a lamp socket, and a partition extending transversely of one end of said platform and substantially normal to the support surface of the latter; means forming an inwardly extending lip at the end of said platform opposite said partition; a compressible gasket on said platform; a substantially hollow lens of transparent material including side and end walls having lower edges engageable with said gasket; one end of said lens being conformingly juxtaposable with said partition when said lens is fully assembled with said housing, and having hook means projecting outwardly therefrom; said housing having aperture means to receive said hook means to anchor said lens in engagement with said partition; the opposite end of said lens having a projecting nose engageable beneath said lip; said lens being assembled to said housing by pressing said lens against said gasket to compress the latter and moving said lens to engage said nose beneath said lip; the relative dimensions of said lens, said nose, and said hook means being such that, when said nose is fully engaged beneath said lips, said one end of said lens is spaced sufficiently from said partition for movement of said lens toward said partition with said hook means in alignment wtih said aperture means; said lens being then anchored by moving said lens toward said partition with engagement of said hook means in said aperture means, with said nose remaining engaged with said lip.

2. An automotive vehicle marker lamp comprising, in combination, a housing including a lens supporting platform, an outwardly projecting flange extending along the periphery of said platform, a lamp socket, and a partition extending transversely of one end of said platform and substantially normal to the support surface of the latter; said flange having an inwardly extending lip at the end of said platform opposite said partition; a compressible gasket on said platform in peripheral contact with said flange and said partition; a substantially hollow lens of transparent material including side and end walls having lower edges peripherally engageable with said flange and engageable with said gasket; one end of said lens being conformingly juxtaposable with said partition when said lens is fully assembled with said housing and having hook means projecting outwardly therefrom; said partition having aperture means to receive said hook means to anchor said lens to said partition; the opposite end of said lens having a projecting nose engageable beneath said lip; said lens being assembled to said housing by pressing said lens against said gasket to compress the latter and moving said lens to engage said nose beneath said lip; the relative dimensions of said lens, said nose, and said hook means being such that, when said nose is fully engaged beneath said lip, said one end of said lens is spaced sufficiently from said partition for movement of said lens toward said platform with said hook means in alignment with said aperture means; said lens being then anchored by moving said lens toward said partition with engagement of said hook means in said aperture means, with said nose remaining engaged with said lip.

3. An automotive vehicle marker lamp, as claimed in claim 1, in which said lamp socket is integral with said platform and concentric with an aperture through said platform.

4. An automotive vehicle marker lamp, as claimed in claim 1, in which said hook means comprises a pair of hooks extending from the lower edge of said lens; said aperture means comprising a pair of apertures formed at the junction of said platform and said partition.

5. An automotive vehicle marker lamp, as claimed in claim 1, in which said partition is intermediate the length of said housing and forms an end wall of a downwardly opening hollow housing portion extending from said partition in the opposite direction to said platform; the outer surfaces of said lens and of said hollow housing portions forming substantially continuations of each other.

6. An automotive vehicle marker lamp comprising, in combination, a housing which is tear drop shape in plan, tapering from a relatively broad forward end to a relatively narrow rear end, said housing including a substantially horizontal lens supporting platform extending from its forward end part way toward its rear end, a peripheral flange extending around the housing and projecting above and below said supporting platform, a lamp socket extending upwardly from the support surface of said platform and concentric with an aperture through said platform, and a partition extending transversely of the inner end of said platform and substantially normal to the support surface of the latter; said flange including an acruate lip extending inwardly from the upper edge thereof at the front end of said platform; said partition being substantially parabolic in elevation; a compressible gasket on said platform in peripheral contact with said flange and said partition; a substantially hollow lens, of substantially parabolic cross section, formed of transparent material and including side and end walls having lower edges peripherally engageable with said flange and engageable with said gasket; the inner end of said lens being conformingly juxtaposable with said partition and having an exterior surface merging with the periphery of said partition when said lens is fully assembled with said housing, said inner end of said lens having hook means projecting outwardly therefrom; said partition having aperture means therein adjacent said platform to receive said hook means to anchor said lens to said partition; the lower edge of the forward end of said lens having a projecting nose engageable beneath said lip; said lens decreasing in height from its forward end to said partition; said lens being assembled to said housing by pressing said lens against said gasket to compress the latter and moving said lens to engage said nose beneath said lip; the relative dimensions of said lens, said nose, and said hook means being such that, when said nose is fully engaged beneath said lip, said one end of said lens is spaced sufficiently from said partition for movement of said lens toward said partition with said hook means in alignment with said aperture means; said lens being then anchored by moving said lens toward said partition with engagement of said hook means in said aperture means, with said nose remaining engaged with said lip.

7. An automotive vehicle marker lamp, as claimed in claim 6, in which said lens has a rear wall spaced inwardly from the rear end edge of said lens so that the side walls and the top wall thereof form a rib projecting from said rear wall; said hook means comprising a pair of hooks at the lower ends of said rib.

8. An automotive vehicle marker lamp, as claimed in claim 6, said platform having its under surface formed with a circular recess concentric with said socket and of larger diameter than the aperture aligned with said socket; and sealing gasket means for said lamp having the general shape of, and slightly larger than said housing, in plan, shrouding the lower extending portion of said peripheral flange, whereby to form a water-tightly sealed mounting for said lamp; said sealing gasket means including an annular body of compressible material compressed in said recess.

9. An automotive vehicle marker lamp, as claimed in claim 7, in which said partition and said rear wall of said lens are substantially parallel to each other and extend upwardly from said platform and with a slight upward slope toward the rear of said lamp.

10. An automotive vehicle marker lamp, as claimed in claim 6, in which the inner surface of said lens is formed with the series of inwardly convex parallel ribs extending transversely of said lens.

11. An automotive vehicle marker lamp, as claimed in claim 10, in which said ribs are interrupted by a plane area extending longitudinally of the top and front walls of said lens.

References Cited by the Examiner

UNITED STATES PATENTS

| | | | |
|---|---|---|---|
| 2,343,598 | 3/1944 | Wagner | 240—7.1 |
| 2,428,167 | 9/1947 | Linton | 240—2 |
| 2,566,404 | 9/1951 | Daon | 240—7.1 X |
| 2,685,639 | 8/1954 | Wiley | 240—41.55 X |

FOREIGN PATENTS

| | | |
|---|---|---|
| 850,681 | 10/1960 | Great Britain. |
| 853,936 | 11/1960 | Great Britain. |

NORTON ANSHER, *Primary Examiner.*